United States Patent

Farwell

[19]

[11] Patent Number: 5,870,445
[45] Date of Patent: Feb. 9, 1999

[54] FREQUENCY INDEPENDENT CLOCK SYNCHRONIZER

[75] Inventor: William D. Farwell, Thousand Oaks, Calif.

[73] Assignee: Raytheon Company, Lexington, Mass.

[21] Appl. No.: 579,522

[22] Filed: Dec. 27, 1995

[51] Int. Cl.⁶ ...................................................... H04L 7/00
[52] U.S. Cl. .......................... 375/371; 375/354; 375/375; 370/503; 370/517
[58] Field of Search ...................................... 375/293, 294, 375/354, 371, 373, 376, 375; 370/503, 516, 517, 518, 519

[56] References Cited

U.S. PATENT DOCUMENTS

| | | | |
|---|---|---|---|
| 5,223,755 | 6/1993 | Richley | 375/376 |
| 5,544,203 | 8/1996 | Casasanta et al. | 375/376 |
| 5,604,775 | 2/1997 | Saitoh et al. | 375/376 |

*Primary Examiner*—Wellington Chin
*Assistant Examiner*—Congvan Tran
*Attorney, Agent, or Firm*—Leonard A. Alkov; Glenn H. Lenzen, Jr.

[57] ABSTRACT

A clock distribution system including a variable delay circuit responsive to a reference clock signal having a fixed clock pulse width and a variable clock period for providing a delayed clock signal, an inverter for inverting the delayed clock signal to an inverted delayed clock signal, a clock tree for providing multiple replicas of the inverted delayed clock signal, a comparator responsive to the reference clock signal and a selected one of the multiple replicas of the inverted delayed clock signal for controlling the variable delay circuit such that the selected replica is delayed by one clock pulse width relative to the reference clock signal. Also disclosed is a shift register controlled variable delay line that can be implemented in the variable delay circuit.

4 Claims, 2 Drawing Sheets

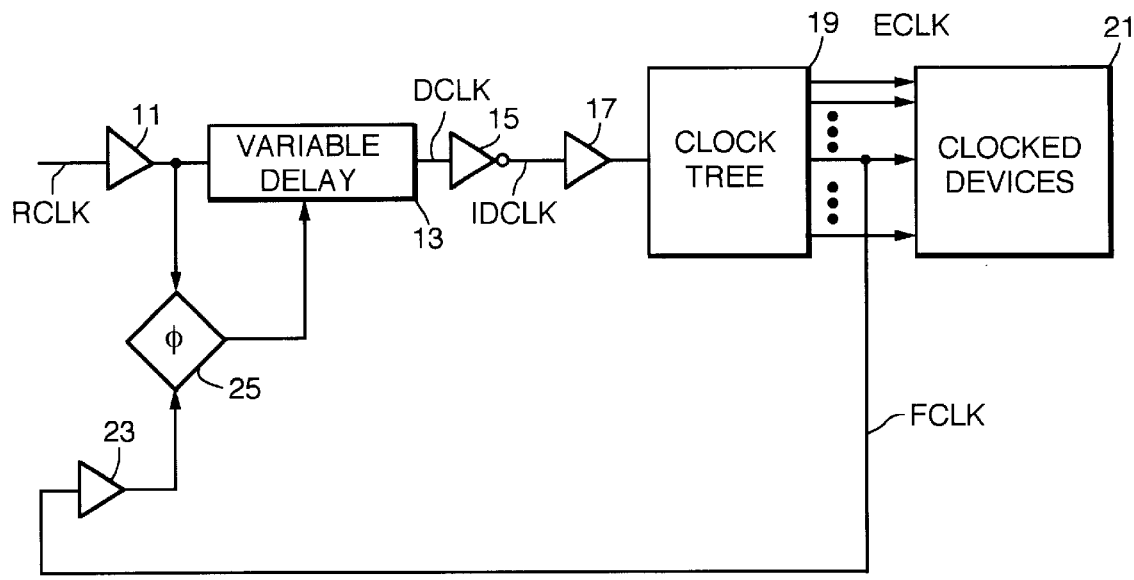
FIG. 1.
FIG. 2.
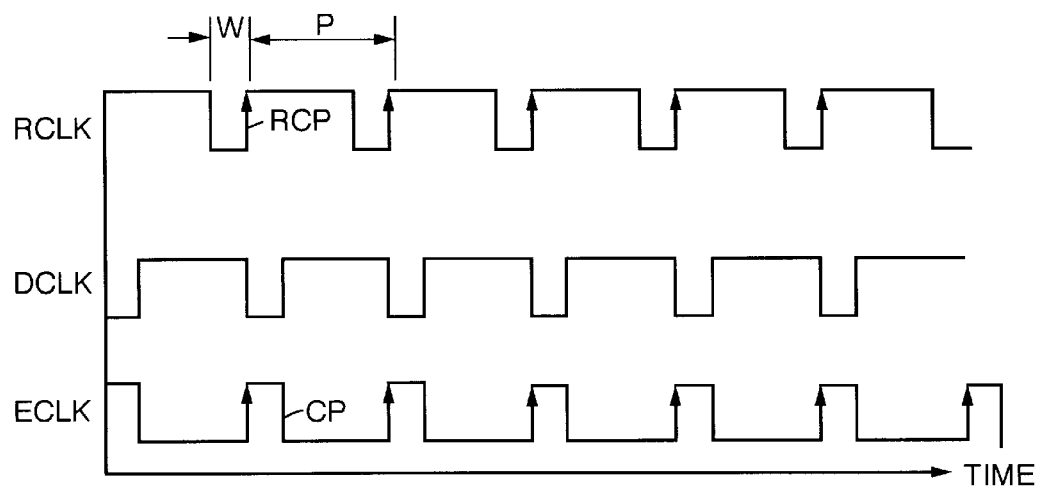

FREQUENCY INDEPENDENT CLOCK SYNCHRONIZER

This invention was made with Government support under Contract F33657-91-C-0006 (Lockheed RK78701) awarded by the Air Force. The Government has certain rights in this invention.

BACKGROUND OF THE INVENTION

The subject invention is directed generally to circuitry for synchronizing clock signals in a digital system, and more particularly to clock synchronizing circuitry that operates independently of clock signal frequency.

The clock system of a digital system generates clock signals and distributes such clock signals to multiple points of use to synchronize changes in the state of the digital system. The multiple clocks are copies of an external reference clock, and ideally are synchronized or in phase such that all clocked digital devices in a system are clocked at the same instants in time. However, as a result of different insertion delays of circuit components in the clock distribution paths of a clock system, the clocks at the multiple points of use are not synchronized, whereby the active edges of the clock signals do not occur at the same time at the different points of use. As is well known, depending on factors such as clock frequency and the set-up time, hold time, and propagation delay characteristics of the clocked devices, improper data may be stored in clocked devices as a result of the time difference or clock skew between the respective active clock transitions for a sending device and a receiving device that receives data from the sending device.

Clock systems commonly comprise a plurality of clock trees that are driven with a single external master clock, wherein each clock tree provides clock signals to a predetermined group of clocked digital devices. For example, a digital system comprised of a plurality of application specific integrated circuits (ASICs) can have a separate clock tree within each ASIC. For synchronization, the clocks provided by clock trees have been phase locked by use of phase locking circuitry, as for example disclosed in Motorola Application Note AN1509 which discloses a phase compensation technique, a period compensation technique, and an inverted period compensation technique for compensating different delays in the clock signal paths. However, the period compensation techniques, as well as analog phase locked loop methods, are restricted to a limited frequency range and cannot tolerate the use of gated clocks. The phase compensation technique does allow unlimited frequency range and clock gating, but requires that two clocks be distributed.

SUMMARY OF THE INVENTION

It would therefore be an advantage to provide a phase compensation clock synchronizing circuit that uses only a single clock, allows for unlimited frequency range, and accommodates clock gating.

Another advantage would be to provide to provide a variable delay line for use in a phase compensation clock synchronizing circuit and which is free of discontinuities, can be controlled simply and reliably, maintains pulse fidelity regardless of length, and is easily constructed to any required length.

The foregoing and other advantages are provided by the invention in a clock distribution system that includes a variable delay circuit responsive to a reference clock signal for providing a delayed clock signal, an inverter for inverting the delayed clock signal to provide an inverted delayed clock signal, a clock tree for providing multiple replicas of the inverted delayed clock signal, a comparator responsive to the reference clock signal and a selected one of the multiple replicas of the inverted delayed clock signal for controlling the variable delay circuit such that the selected replica is delayed by one clock pulse width relative to the reference clock signal. A further aspect of the invention is directed to a variable delay line that can be implemented in the variable delay circuit of the clock synchronizing circuit.

BRIEF DESCRIPTION OF THE DRAWINGS

The advantages and features of the disclosed invention will readily be appreciated by persons skilled in the art from the following detailed description when read in conjunction with the drawing wherein:

FIG. 1 is a schematic circuit diagram of a clock synchronizing circuit in accordance with the invention.

FIG. 2 is timing diagram that sets forth the selected signals of the clock synchronizing circuit of FIG. 1.

DETAILED DESCRIPTION OF THE DISCLOSURE

Figure 3:
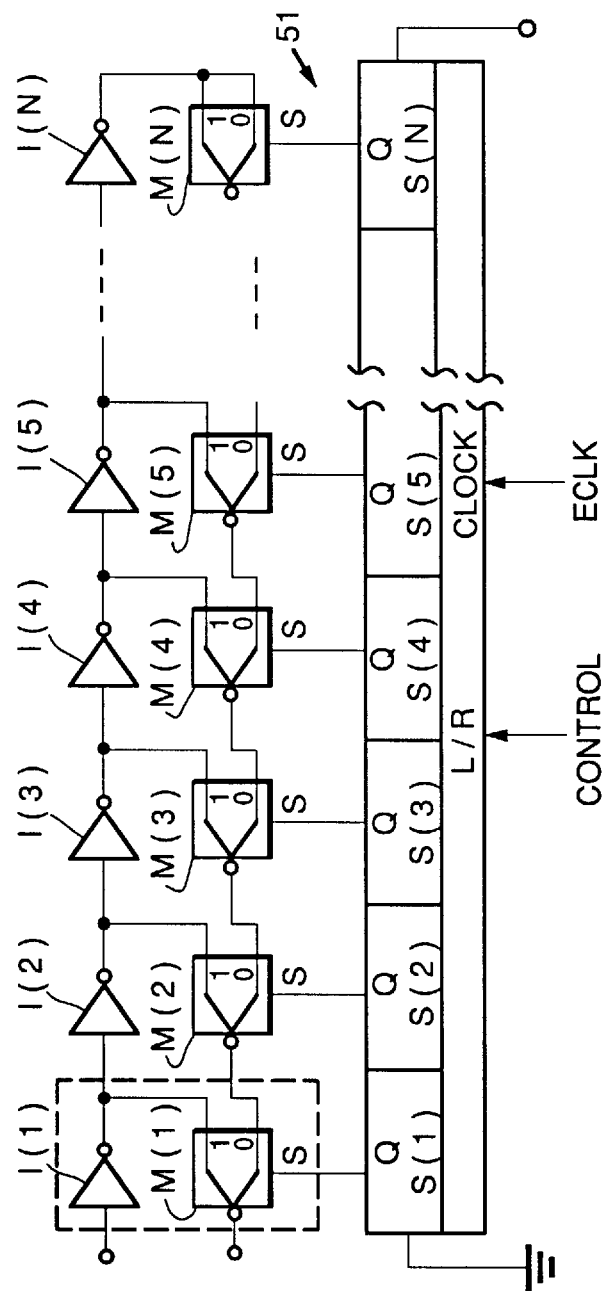
FIG. 3 is a schematic diagram of a variable delay line that can be advantageously implemented in the clock synchronizing circuit of FIG. 1.

In the following detailed description and in the several figures of the drawing, like elements are identified with like reference numerals.

Referring now to FIG. 1, set forth therein is a schematic illustration of a clock synchronizing circuit in accordance with the invention which can be implemented, for example, with each of a plurality of clock trees in a digital system for synchronizing the outputs of the clock trees. The clock synchronizing circuit includes an input buffer 11 that receives a master reference clock signal RCLK and outputs a buffered reference clock signal BCLK to a variable delay circuit 13 which outputs a delayed clock signal DCLK. The delayed clock signal DCLK is provided to an inverter 15 which produces an inverted replica IDCLK of the delayed clock signal DCLK. The inverted clock signal output IDCLK of the inverter 15 is provided to a clock buffer 17 whose output is provided to a clock distribution tree 19. The clock distribution tree 19 provides a plurality of in phase distributed clock signals ECLK to a plurality of clocked digital devices 21. A feedback clock signal FCLK that is representative of the distributed clock signals ECLK is taken from one of the clocked digital devices and provided to a feedback buffer 23 whose delay characteristics are matched with the delay characteristics of the input buffer 11. The output of the feedback buffer 23 and the output of the input buffer 11 are provided as inputs to a phase comparator 25 which adjusts the delay of the variable delay circuit 13 such that the feedback clock signal FCLK, which is representative of the distributed clock signals ECLK, is delayed by one clock pulse width relative to the reference clock RCLK. Thus, the circuit compensates for all clock tree delays, including traces, since the feedback clock signal FCLK is taken from an actual clocked device. It should be appreciated that the input buffer 11 and the feedback buffer 23 can be omitted, depending upon the particular implementation.

The reference clock signal RCLK more particularly comprises a periodic signal having a negative going reference clock pulse RCP as shown in FIG. 2. Pursuant to the inversion provided by the inverter and the total delay of one clock pulse width applied to the distributed clock signals ECLK, a distributed clock signal ECLK includes a positive clock pulse CP having a positive active edge that is aligned with the positive edge of the negative clock pulse of the reference clock signal RCLK. In accordance with the invention, the width W of the reference clock pulse RCP is fixed, while the period P of the reference clock signal RCLK can be varied, thus allowing the frequency of the reference clock signal RCLK to be varied. While FIG. 2 depicts a rising edge active distributed clock signal ECLK for purposes of a particular example, it should be appreciated that falling edge active distributed clock signals ECLK can also be used, in which case the reference clock signal RCLK would be inverted from that shown in FIG. 2.

Referring now to FIG. 3, set forth therein is an illustrative example of a variable delay line that can be implemented in the variable delay 13 of the clock synchronizing circuit of FIG. 1. The variable delay line includes a sequence of N serially connected inverters I(1) through I(N), wherein the input to the inverter I(1) comprises the input to the variable delay line and wherein the input to each of the inverters I(2) through I(N) comprises the output of the inverter that is immediately prior in sequence. The variable delay of FIG. 3 further includes a sequence of N inverting multiplexers M(1) through M(N) which are respectively associated with corresponding inverters I(1) through I(N), and wherein the output of the first in sequence multiplexer M(1) comprises the output of the delay line. The input signal to the variable delay line comprises the buffered reference clock output BCLK of the input buffer 11, and the output of the variable delay line is the delayed clock signal DCLK. Each of the inverting multiplexers M(1) through M(N) includes an input designated by a 1 and another input designated by a 0, and each is controlled by the logic level at its control input S such that the output of a multiplexer is a replica of the logic level at its 1 input when the control input is a 1, and is a replica of the logic level at its 0 input when the control input is 0. The 1 input of each of the inverting multiplexers M(1) through M(N) receives the output of a corresponding one of the inverters I(1) through I(N−1), while the 0 input of each of the inverting multiplexers M(1) through M(N−1) is provided by the output of the next in sequence multiplexer. The 0 input of the last in sequence multiplexer M(N) is provided by the output of the corresponding inverter I(N). The control signals to the control inputs S of the inverting multiplexers M(1) through M(N) are provided by the Q outputs of an N-stage bidirectional shift register 51 that includes stages S(1) through S(N). The left input to the shift register 51 is held at a logical 0 such that a shift right inputs a 0 to the stage S(1) of the shift register, and the right input to the shift register 51 is held at a logical 1 such that a shift left inputs a 0 to the stage S(N) of the shift register 51. The shift register 51 operates conventionally and is clocked by one of the distributed clock signal ECLK which is provided to its clock input, and shifting is controlled by a CONTROL signal provided to its left/right control input L/R. Since the shift register 51 is continuously clocked, at equilibrium the CONTROL signal continuously alternates states and the shift register 51 dithers continuously left and right by one stage.

The delay line generally operates as follows. The input BCLK to the delay line is propagated through each of the inverters I(1) through (N) in sequence, while each of the inverting multiplexers provides an output that is either a replica of the output of the corresponding inverter or a replica of the output of the next in sequence multiplexer, depending on the logical state of the control signal at the control input S of a multiplexer. Thus, the output of Kth inverter can propagate through the multiplexers M(K) through M(1) to the output of the delay line only if stage S(K) of the shift register contains a 1, and the stages S(1) through S(K−1) contains 0s. Effectively, each inverter and the multiplexer that is connected to its output form an inverter/multiplexer stage that comprises a non-inverting delay element, and the total delay provided by the variable delay line is controlled by controlling the number of inverter/multiplexer stages through which the input signal must propagate. The number of inverter/multiplexer stages through which the input signal propagates is more particularly controlled by placing a 1 in a selected shift register stage that controls the multiplexer of the last in sequence inverter/multiplexer stage through which the input signal is to be propagated and placing 0s in the stages to the left of the selected shift register stage. This can be achieved, for example, by filling the shift register with all 1's by performing N shifts to the left, and then performing (K−1) shifts wherein K is the number of number of inverter/multiplexer delays desired, starting in sequence with the inverter/multiplexer stage I(1)/M(1). If the amount of delay is to be changed, then an appropriate number of left or right shifts is performed, depending on whether the delay is to be decreased or increased, respectively.

By way of illustrative example, the delays provided by the each of the inverter/multiplexer stages I(1)/M(1) through I(N)/M(N) can be the same (i.e., constant), or they can non-constant, for example with the first inverter/multiplexer stage I(1)/M(1) being of the shortest delay and subsequent inverter/multiplexer stages being of increasingly longer delays up to the last inverter/multiplexer stage I(N)/M(N) which provides the longest delay.

The variable delay line FIG. 3 advantageously can be made indefinitely long by adding further inverter/multiplexer delay stages as required to achieve a desired maximum delay, which has no effect on step size or minimum delay, and advantageously maintains clock pulse fidelity regardless of length. In particular, although there may be a small difference in low-to-high and high-to-low transition delays through each inverter/multiplexer stage, these errors cancel for even numbers of inverter/multiplexer stages and thus the maximum error is that of one inverter/multiplexer stage.

Thus, the foregoing has been a disclosure of a clock synchronizing circuit which allows for variation of the clock period and for instantaneous change of the clock period from one clock to the next, and a variable delay line that can be used in the clock synchronizing circuit to advantageously provide a maximum delay range without clock pulse distortion and with a minimum number of delay elements.

Although the foregoing has been a description and illustration of specific embodiments of the invention, various modifications and changes thereto can be made by persons skilled in the art without departing from the scope and spirit of the invention as defined by the following claims.

What is claimed is:

1. A variable delay line comprising:
   a plurality of digital inverters connected in series and arranged in a sequence wherein the first inverter in sequence receives an input digital signal which is propagated through the inverters in sequence;
   a plurality of two-input inverting multiplexers respectively associated with digital inverters and arranged in a corresponding sequence wherein each multiplexer receives an input from an associated one of said inverters, each multiplexer except for the last in sequence further receiving an input from a multiplexer that is next in sequence, such that the output of the first in sequence multiplexer comprises an output of the delay line, and such that each inverter and its associated multiplexer forms an inverter/multiplexer delay stages; and a shift register having a plurality of stages for respectively controlling said plurality of inverting multiplexers.

2. The delay line of claim 1 wherein said inverter/multiplexer delay stages provide substantially identical delays.

3. The delay line of claim 1 wherein said inverter/multiplexer stages provide different delays.

4. The delay line of claim 1 wherein said shift register comprises a bidirectional shift register.

* * * * *